(12) United States Patent  
Todorovic

(10) Patent No.: US 9,932,932 B2
(45) Date of Patent: Apr. 3, 2018

(54) AEROENGINE THRUST REVERSER ARRANGEMENT

(71) Applicant: ROLLS-ROYCE DEUTSCHLAND LTD & CO KG, Dahlewitz (DE)

(72) Inventor: Predrag Todorovic, Berlin (DE)

(73) Assignee: ROLLS-ROYCE DEUTSCHLAND LTD & CO KG, Dahlewitz (DE)

( * ) Notice: Subject to any disclaimer, the term of this patent is extended or adjusted under 35 U.S.C. 154(b) by 807 days.

(21) Appl. No.: 14/060,174

(22) Filed: Oct. 22, 2013

(65) Prior Publication Data

US 2014/0116026 A1 May 1, 2014

(30) Foreign Application Priority Data

Oct. 29, 2012 (GB) .................................. 1219366.0

(51) Int. Cl.
*F02K 1/72* (2006.01)
(52) U.S. Cl.
CPC ............ *F02K 1/72* (2013.01); *F05D 2240/12* (2013.01); *F05D 2250/71* (2013.01); *Y02T 50/672* (2013.01)
(58) Field of Classification Search
CPC ..... F02K 1/72; F02K 1/70; F02K 1/68; F02K 1/76
USPC .............................. 60/226.2, 230; 239/265.29
See application file for complete search history.

(56) References Cited

U.S. PATENT DOCUMENTS

| | | | | |
|---|---|---|---|---|
| 3,262,268 A * | 7/1966 | Beavers | ..................... | F02K 1/72 239/265.19 |
| 3,829,020 A * | 8/1974 | Stearns | ...................... | F02K 1/09 181/216 |
| 3,981,451 A | 9/1976 | Prior et al. | | |
| 4,731,991 A * | 3/1988 | Newton | ..................... | F02K 1/72 239/265.31 |
| 5,103,634 A * | 4/1992 | Harrison | .................. | F02K 1/563 239/265.33 |
| 5,778,659 A * | 7/1998 | Duesler | ..................... | F02K 1/09 239/265.27 |
| 7,484,356 B1 * | 2/2009 | Lair | .......................... | F02K 1/72 60/226.2 |
| 2001/0010148 A1 * | 8/2001 | Michel | ...................... | F02K 1/72 60/226.1 |

(Continued)

FOREIGN PATENT DOCUMENTS

EP 0 809 011 A2 11/1997
EP 1 852 595 A2 11/2007
(Continued)

OTHER PUBLICATIONS

Jan. 9, 2013 British Search Report issued in British Application No. GB1219366.0.

*Primary Examiner* — William H Rodriguez
*Assistant Examiner* — Thomas Burke
(74) *Attorney, Agent, or Firm* — Oliff PLC

(57) ABSTRACT

A gas turbine engine has a core engine and a nacelle having a cowl translatable along the axis of the engine from a stowed position to a deployed position, A thrust reverser cascade extends circumferentially about the engine axis. To obviate the need for additional blanking cascades the cowl has a forwardly extending tongue that in the deployed position of the cowl is at the same axial position as the thrust reverser cascade.

11 Claims, 6 Drawing Sheets

(56) References Cited

U.S. PATENT DOCUMENTS

| | | | | |
|---|---|---|---|---|
| 2006/0145001 | A1* | 7/2006 | Smith | B64D 29/06 244/110 B |
| 2008/0271432 | A1* | 11/2008 | Tsou | F02K 1/72 60/226.2 |
| 2009/0151320 | A1* | 6/2009 | Sternberger | F02K 1/72 60/226.2 |
| 2009/0188233 | A1 | 7/2009 | Vauchel et al. | |
| 2010/0031630 | A1* | 2/2010 | Bulin | F02K 1/72 60/226.2 |
| 2010/0064659 | A1* | 3/2010 | Wang | F02K 1/09 60/226.2 |
| 2010/0107599 | A1* | 5/2010 | Vauchel | B64D 29/08 60/226.2 |
| 2011/0259435 | A1* | 10/2011 | Rouyer | B64D 29/00 137/15.2 |
| 2013/0266423 | A1 | 10/2013 | Vauchel | |
| 2014/0116025 | A1* | 5/2014 | Todorovic | F02K 1/72 60/226.2 |

FOREIGN PATENT DOCUMENTS

| | | |
|---|---|---|
| EP | 2 243 945 A2 | 10/2010 |
| EP | 2 278 147 A2 | 1/2011 |
| WO | WO 2011/154644 A1 | 12/2011 |

\* cited by examiner

AEROENGINE THRUST REVERSER ARRANGEMENT

TECHNICAL FIELD OF INVENTION

The invention relates to thrust reverser arrangements for a gas turbine engine and in particular a cascade thrust reverser and more particularly a translating cascade thrust reverser.

BACKGROUND OF INVENTION

Thrust reversers are provided on a gas turbine engine to selectively alter the direction of the fan flow from the engine. The thrust reversers are typically deployed on landing to decelerate an aircraft and sometimes used for power-back of the aircraft.

One type of thrust reverser is known as a cascade thrust reverser that has an array of cascade boxes downstream of a fan casing that are deployed by an axial rearward translation of a trans cowl that causes blocker doors to rotate from a stowed position to their deployed position and direct the bypass duct air radially outwards, through the cascades. Each cascade box has a plurality of guide vanes to turn the air.

In order to prevent lift being generated on opening of the cascade it is possible to provide a blanking cascade towards the bottom of the engine. The blanking cascade inhibits the flow of air under the engine. In alternative arrangements for efflux control specially oriented guide vanes may be used to better control the direction of outflowing air.

Engine efficiency is driven partly by the weight of the engine, including the nacelle and thrust reverser, and it is an object of the invention to seek to provide an improved thrust reverser arrangement.

STATEMENTS OF INVENTION

According to an aspect of the invention there is provided a gas turbine engine comprising a core engine and a nacelle having a cowl translatable along the axis of the engine from a stowed position to a deployed position, the engine further comprising a thrust reverser cascade extending circumferentially about the engine axis, wherein the cowl has a forwardly extending tongue that in the deployed position of the cowl is at the same axial position as the thrust reverser cascade and which engages the thrust reverser cascade to provide hoop continuity to the cascade.

Preferably the tongue is an extension of the cowl and is formed of the same material as the cowl. It may be integral with the cowl or mechanically fastened thereto. The tongue may be curved with the same radius of curvature as the cowl in order to provide part of the external surface of the nacelle. The tongue may have two parallel edges extending from the cowl, or the edges may extend in a convergingly such that the distal end of the tongue away from the cowl is narrower than the proximal end.

The tongue is preferably the same or greater axial length as the cascade to act as a plate that inhibits the flow of thrust reverser air from the engine in that direction. In some embodiments a shorter tongue may be used and the radially inside surface of the tongue may have a profile which turns the thrust reverser air toward the front of the engine.

In the stowed position of the cowl the tongue may be axially forward of the thrust reverser cascade. The tongue may be located in a corresponding recess in an axially forward nacelle component. In preferred embodiments the tongue extends from the exterior wall of the cowl and locates in the recess to lie flush with the axially forward nacelle component such that the nacelle has a streamlined exterior surface.

Advantageously, the cowl and the axially forward nacelle component may be provided by separately hinged doors that can be rotated away from an engine core to provide access to the engine core for maintenance or inspection purposes. The cowl doors may be hinged to the engine pylon, which is typically at the top of the engine. It is desirable to position the tongue to the underside of the engine. The tongue may be provided by two parts, each part being located on a respective cowl door and arranged such that when the doors are closed the parts abut to form the tongue. Locking features may be provided to secure the parts together.

Preferably in the deployed position of the cowl the tongue engages the cascade to provide hoop continuity to the cascade. This provides a number of advantages in that it is no longer necessary for the cascade to have blanking cascade panels to provide the hoop continuity. The removal of the blanking cascade panel reduces the weight of the engine and frees a volume that may be used to accommodate an accessory such as a pump, sensor arrangement, gearbox, etc. The accessory may be directly mounted to the fan casing or other rigid structure. Advantageously, the accessory is easily accessible by deploying the translating cowl to open access to the volume containing the accessory.

The cascade may be arranged as at least two circumferentially extending cascade portions, wherein two of the portions are separated by the tongue. The cascade portions preferably extend in opposite circumferential directions circumferentially from the tongue.

Preferably the tongue has a radially extending lip that engages a channel in the cascade. The channel and lip preferably both extend axially to permit the lip to translate within the channel. The channel may extend forward of the cascade to locate the lip when the cowl is in its stowed position. The lip may extend aft of the tongue to ensure that the cascade is provided with hoop continuity when the cowl is in its stowed position. In a preferred embodiment the lip extends radially inwardly towards the axis of the engine and a lip is provided along each of the axial edges of the tongue with each lip being locatable within a respective channel.

DESCRIPTION OF DRAWINGS

The invention will now be described, by way of example only, with reference to the accompanying drawings in which.

DETAILED DESCRIPTION OF INVENTION

Figure 1:
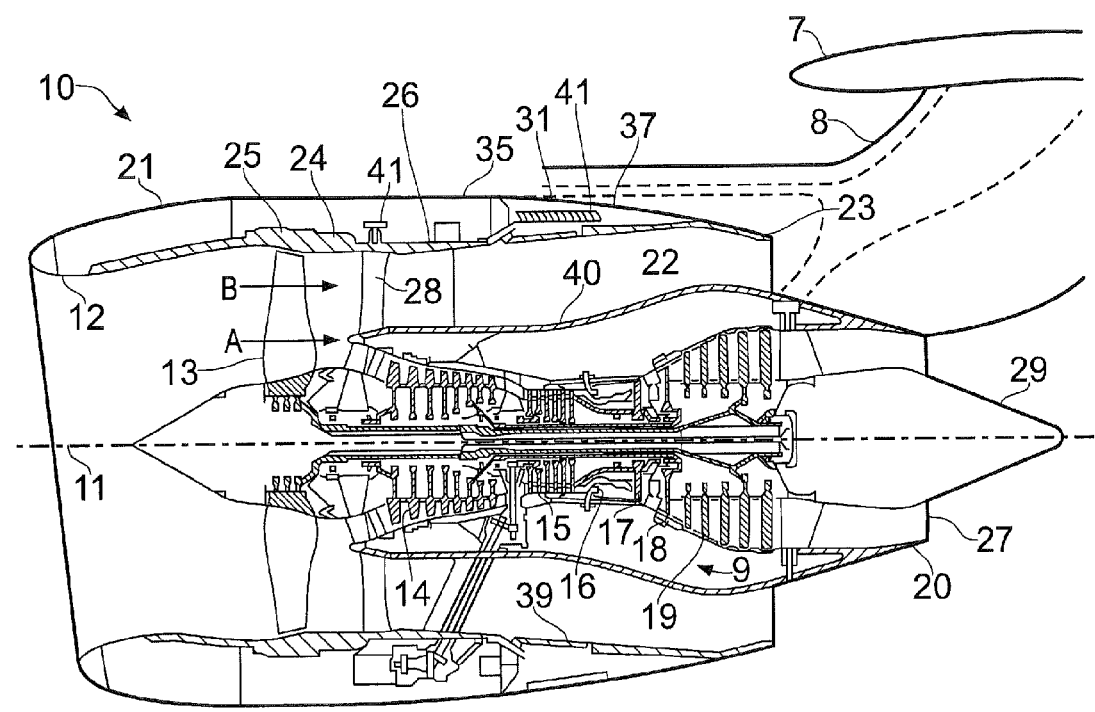
FIG. 1 depicts an exemplary ducted gas turbine having a thrust reverser cascade.

Referring to FIG. 1, a ducted fan gas turbine engine generally indicated at 10 has a principal and rotational axis 11. The engine 10 comprises a propulsive fan 13 and a core engine 9 having, in axial flow series, an air intake 12, an intermediate pressure compressor 14, a high-pressure compressor 15, combustion equipment 16, a high-pressure turbine, an intermediate-pressure turbine 18, a low-pressure turbine 19 and terminating with a core exhaust nozzle 20. A nacelle 21 generally surrounds the engine 10 and defines the intake 12, a bypass duct 22 and an exhaust nozzle 23.

The gas turbine engine 10 works in the conventional manner so that air entering the intake 11 is accelerated by the fan 13 to produce two air flows: a first airflow A into the intermediate pressure compressor 14 and a second airflow B which passes through a bypass duct 22 to provide propulsive thrust. The intermediate pressure compressor 14 compresses the airflow A directed into it before delivering that air to the high pressure compressor 15 where further compression takes place.

The compressed air exhausted from the high pressure compressor 15 is directed into the combustor 16 where it is mixed with fuel and combusted. The resultant hot combustion products then expand through, and thereby drive, the high, intermediate and low-pressure turbines 17, 18, 19 before being exhausted through the nozzles 20 to provide additional propulsive thrust. The high, intermediate and low pressure turbines 17, 18, 19 respectively drive the high, intermediate pressure compressors 15, 14 and the fan 13 by suitable interconnecting shafts.

A centre plug 29 is positioned within the core exhaust nozzle 20 to provide a form for the core gas flow A to expand against and to smooth its flow from the core engine. The centre plug 29 extends rearward of the cone nozzle's exit plane 27.

The fan is circumferentially surrounded by a structural member in the form of a fan casing 24 which is supported by an annular array of outlet guide vanes 28. The fan casing 24 comprises a rigid containment casing 25 and attached rearwardly thereto is a rear fan casing 26.

The gas turbine engine 10 is installed under an aircraft wing 7 via a pylon 8. The nacelle 21 comprises an axially forward cover 35 and a translatable cowl 37. Both the cover and the cowl are provided by C-shaped openable doors with each door being separately hinged to the aircraft pylon 8. The nacelle has a thrust reverser unit 31 which is formed from a number of cascade panels arranged sequentially around the circumference of the engine 10. The hinged doors permit access to the engine core for maintenance or inspection purposes.

Figure 2:
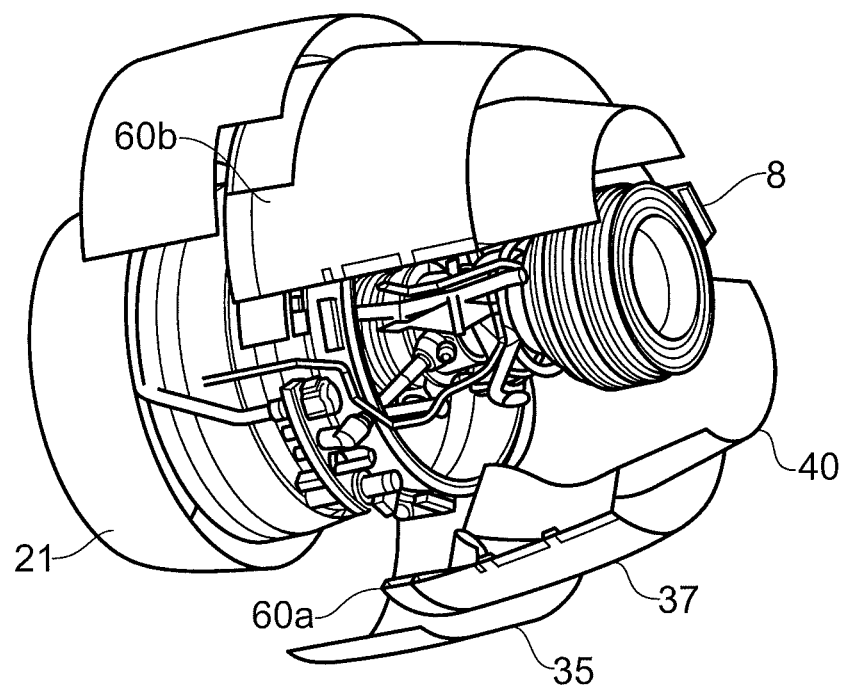
FIG. 2 shows a view of the ducted gas turbine with the cowl open for inspection of the engine core.

FIG. 2 depicts the open nacelle 21 which has hinges positioned at the top of the engine or on the pylon and which permits each part of the C duct defined by the cover 35 and the translating cowl to rotate away from the engine to permit access thereto. Both the cowl and the cover 35 can pivot away from the engine. The thrust reverser unit 31 is mounted to the cover and can pivot away from the engine with the cover.

The cowl 37 is provided with an axially forward tongue 60 which is formed of two parts 60a and 60b extending from each of the two doors forming the translatable cowl. The cover 35 has a recess which engages the tongue when the cowl and cover are closed to provide a streamlined external surface for the nacelle.

Figure 3:
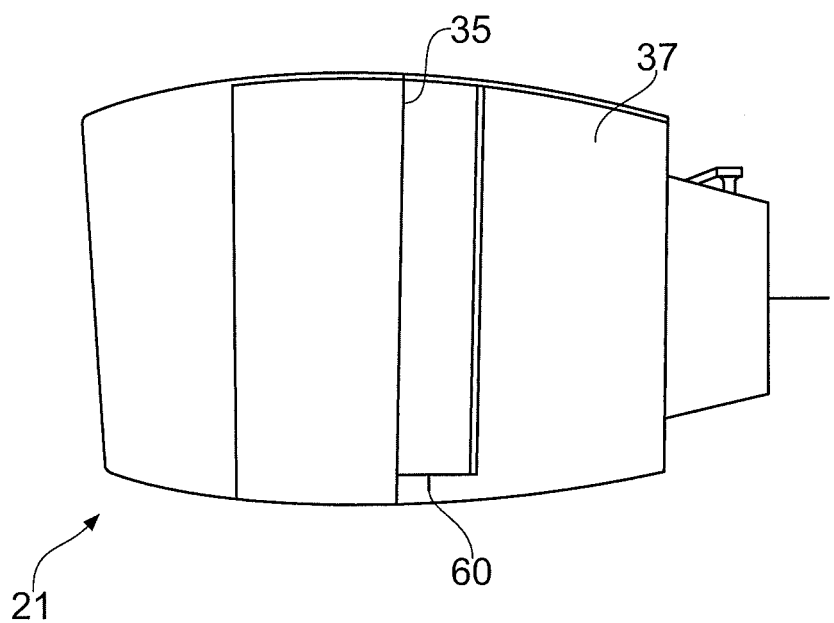
FIG. 3 depicts the nacelle with the cowl in its stowed position.
Figure 4:
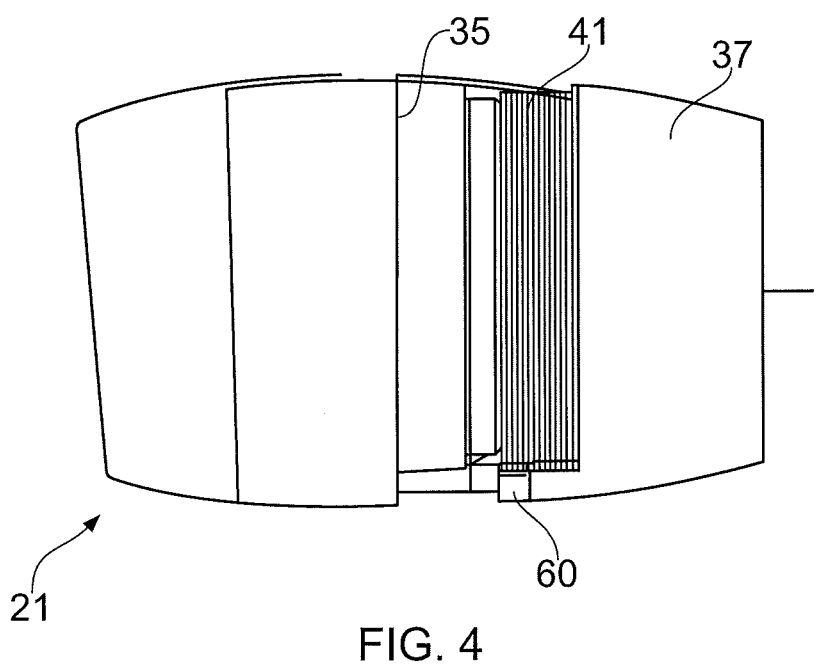
FIG. 4 depicts the nacelle with the cowl in its deployed position.

This is shown in FIG. 3 where the nacelle is closed in a forward flight, stowed thrust reverser unit position. The translatable cowl is in its stowed position such that the cowl abuts the axially forward cover. translatable thrust reverser unit is in an axial forward position in contrast to FIG. 4, where the unit has been deployed rearwardly to open the cascades 41. As shown in FIG. 4 the tongue 60 in the deployed position of the cowl is aligned with the axial position of the cascade. Advantageously, this negates the need for a blanking cascade panel to be provided in the cascade in order to inhibit the flow of thrust reverser air radially towards the ground. The tongue can have a radially inner form that turns the air towards the front of the engine. In both these figures the tongue 60 is located 180 degrees from the pylon (not shown) and is located on the underside of the engine.

Figure 5:
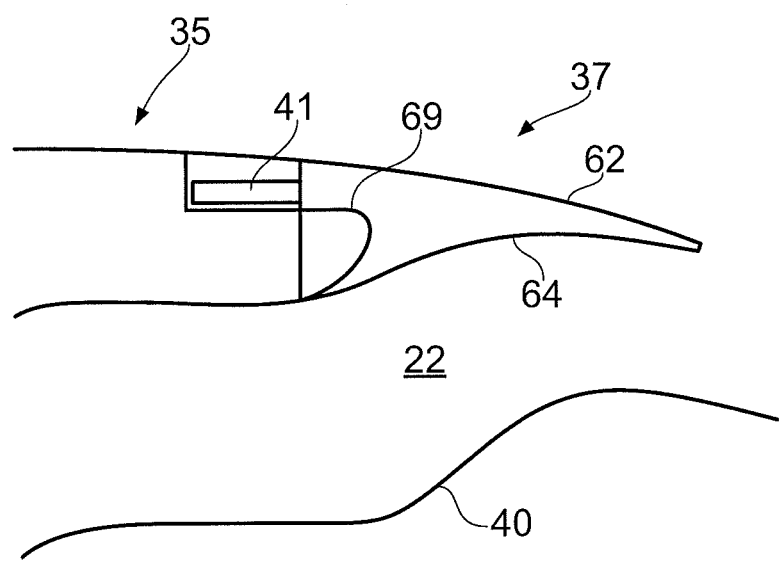
FIG. 5 is a partial cross-section through the engine including the thrust reverser cascades with the cowl in the stowed position.

FIG. 5 is a partial cross section through the cascade and cowl arrangement of FIG. 3 in a region away from the tongue 60. The cowl 37 has a bifurcated fairing that has a radially outer wall 62 that forms an airwashed surface for the external surface of the nacelle and a radially inner wall 64 that forms an airwashed surface for the bypass duct 22. A blocker door (not shown) is located against the radially inner surface of the radially inner wall 64 in the stowed position with the inner wall of the fairing providing additional support for the blocker door against the pressures of the flow through the bypass. The inner wall is stepped to enable the blocker door to be recessed in the stowed position in order to provide a streamlined surface. The inner surface of the radially inner wall forms, along with the inner wall of the cover 35, a streamlined radially outer wall for the bypass duct 22.

Axially forward of the translating cowl a cover 35 surrounds an aerodynamic support structure 69 and between the inner wall of the cover and the support structure 69 there is a cavity 70 within which the cascade 41 is located. When the cowl is in the stowed position of FIGS. 3 and 5 the cascade is isolated from the main flow through the bypass duct by the blocker door and the radially inner wall 64 of the fairing. In addition, any leakage flow through either of these parts is inhibited from leaving the engine by the radially outer wall 62 of the cowl which seals against the cover 35.

The cascade 41 comprises an arrangement of vanes that are designed to turn a flow of air from the bypass duct when the cowl is translated to its open position towards the front of the engine to provide the reverse thrust. The cascade is assembled as a series of panels each of which provides a segment of the circumference of the thrust reverser.

Figure 6:
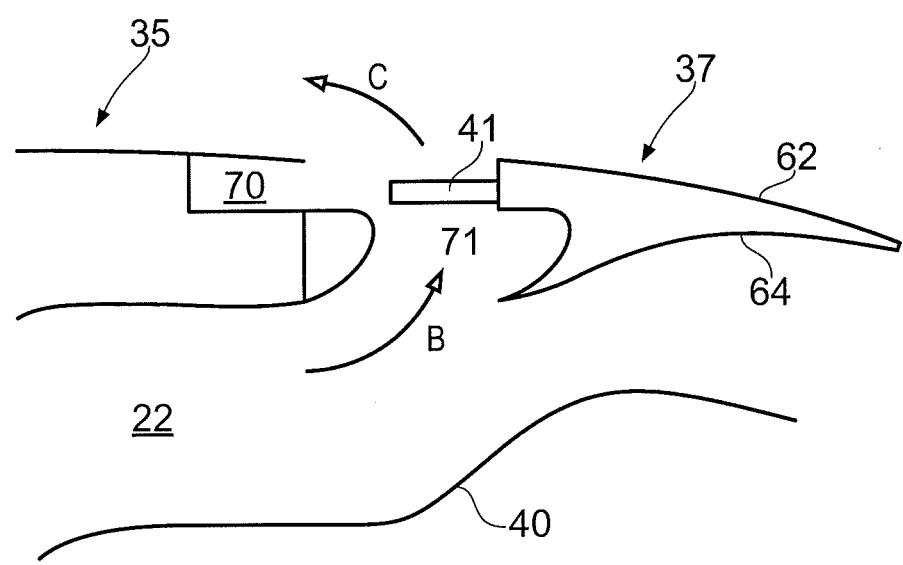
FIG. 6 is a partial cross-section through the engine including the thrust reverser cascades with the cowl in the deployed position.

In FIG. 6 the cowl 37 is shown in its deployed position which is axially rearward of the stowed position. The blocker doors are connected to the cowl by linkages that deploy the blocker doors across the bypass to direct the bypass flow through the cascades where the flow is turned in a forward direction and through a passage opened in the outer wall of the nacelle by the axially rearward movement of the outer wall. The flow of air through the cascade is shown by the arrows B and C. The cascade is mounted to the translating cowl and translates with the cowl from its stowed position within chamber 70 to its deployed position. The movement opens a cascade channel 71 between the aerodynamic support structure 69 and the cowl 37 that is profiled to assist in the forward turn of the thrust reverser air.

Figure 7:
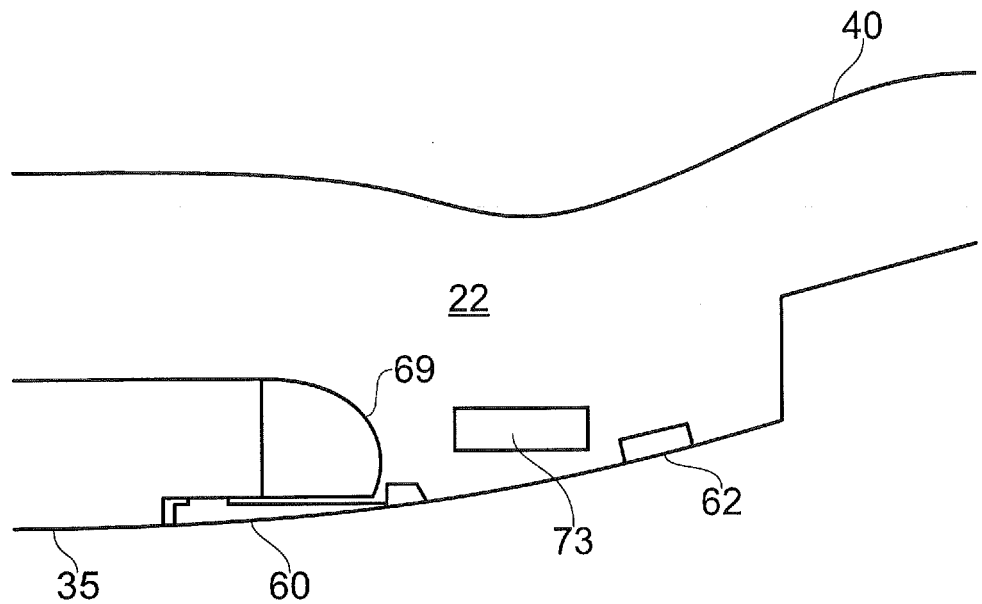
FIG. 7 is a partial cross-section through the engine including the cowl tongue with the cowl in the stowed position.
Figure 8:
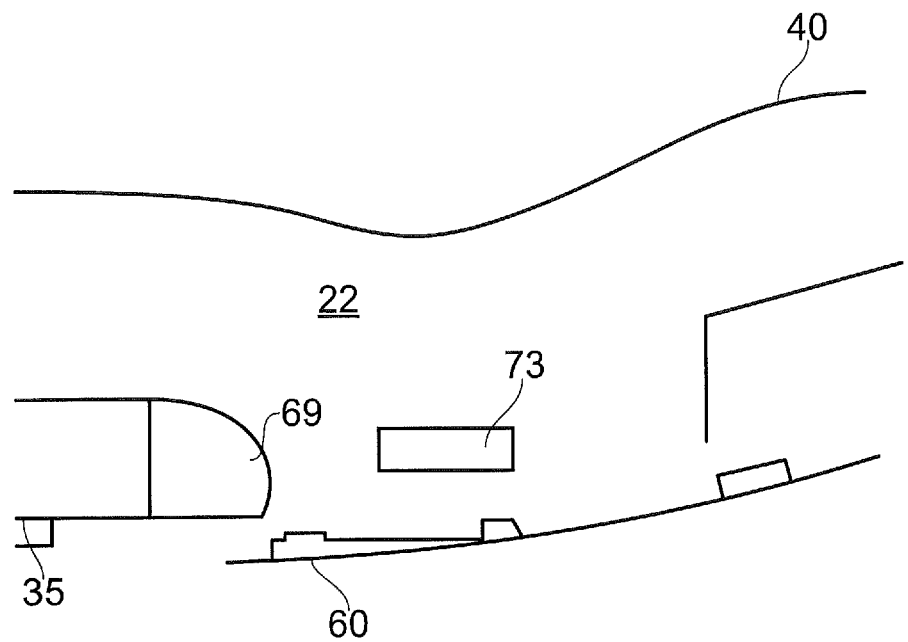
FIG. 8 is a partial cross-section through the engine including the cowl tongue cascades with the cowl in the deployed position.

FIGS. 5 and 6 depict a cross-section taken through the majority of the engine circumference at the thrust reverser cascade. However, at the underside of the engine, as shown in FIG. 7, in the stowed position, and FIG. 8 in the deployed position, the cascade panel is removed in order to provide a volume in which an accessory 73, mounted to the fan casing may be located. Suitable accessories include pumps, gearboxes, generator, sensor arrangements and control units. The accessories may be mounted to the fan casing through an intermediary accessory e.g. the auxiliary gearbox.

The blocker doors are stowed and actuated in the same manner as described previously however, in order to inhibit the directed thrust reverser air from being emitted from the underside of the engine, which could cause lift to be generated, the cowl outer wall has a forwardly protruding tongue 60. The tongue is long enough to ensure that only a minimal amount of air, at a velocity and volume that is insufficient to lift the engine, is emitted past the outer wall.

The tongue is constructed of a suitable material e.g. a composite or metal that may be strengthened to resist the air directed from the blocker door. Typically the tongue will be formed from the same material as that of the translating cowl and, as it is an extension, does not require any special treatment. In the stowed position the tongue engages with a corresponding cut-out in the axially forward cover 35 so as to present a streamlined surface for the exterior surface of the nacelle 21. Appropriate grooves may be provided at the edge of the cut-out, or at the edge of the tongue into which the opposing edges slides to further secure the tongue in use to prevent unwanted flexing that may be caused by buffeting of the air flow as it passes the nacelle in use.

Figure 9:
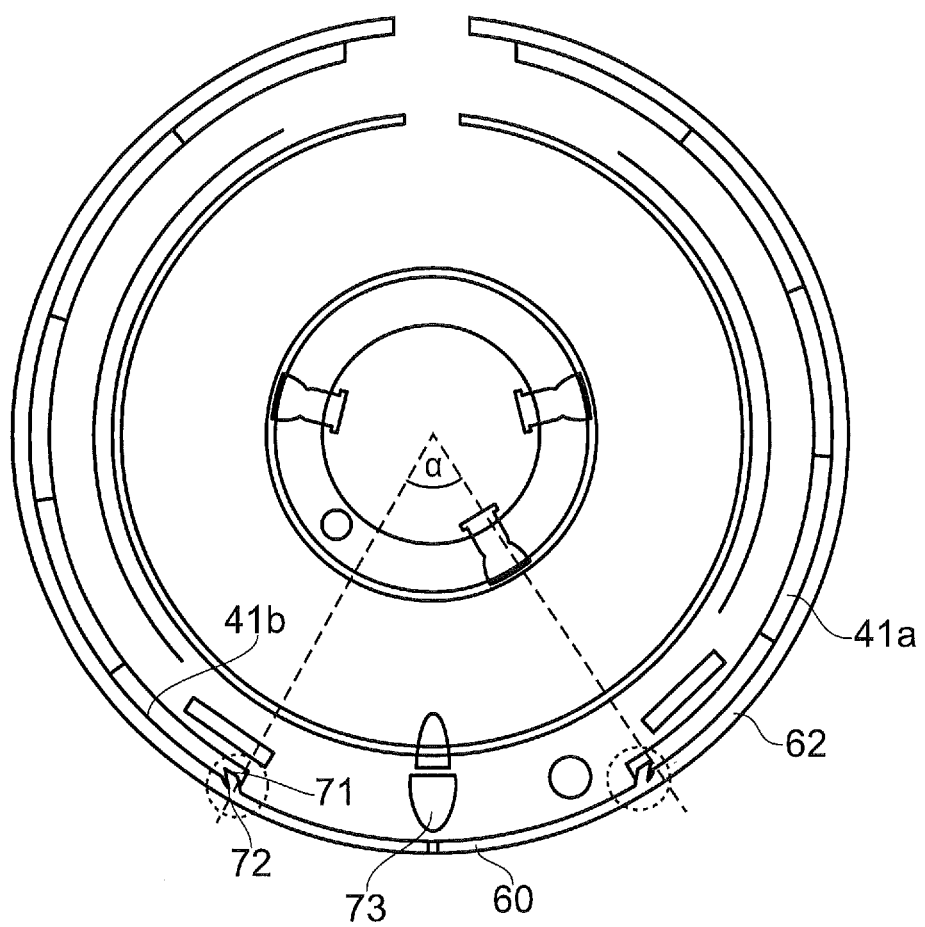
FIG. 9 is a cross section through the engine

FIG. 9 is a cross-section through the engine showing the engagement of the tongue with the cascade panels to keep hoop continuity for the cascade. The engine has a fairing 40 that surrounds the core and a fan casing 26 to which the accessory is mounted. The cascade panels are arranged in two groups 41a, 41b with each group of panels extending around part of the circumference of the engine. The panel groups are joined at the top of the engine to opposite sides of the pylon and at the bottom of the engine to the tongue of the cowl. Each panels group may be a monolithic structure (casted or machined) or may be fabricated from a number of circumferential segments fastened or welded together. The cascade carries substantial hoop stresses as well as axial, vertical and torque loads.

The tongue is provided with lugs 72 or some other form of element that engage the bottom-most cascade panels to ensure hoop continuity of the cascade. By providing hoop continuity to the cascade the cascade is strengthened to resist the forces and pressures generated during thrust reversal. The cascade panels are connected at their rear end by a forward frame of the translating cowl. The lugs that are fastened to the cascade by mechanical or adhesive means transfer the hoop loads to the tongue which ensures hoop continuity for the cascade. The sector angle α is defined by the achievable thrust reverser unit efficiency but is typically less than 90 degrees or less and more preferably 60 degrees or less.

Access to the core engine and associated accessories is achieved by rotating open the translating cowls however sufficient access may be provided for some requirements by simple deployment of the thrust reverser unit.

By providing a cascade that is joined at the bottom of the engine by the cowl outer skin it will be appreciated that it becomes possible to omit some of the blanking cascade panels that enables a volume, or radial space, for the direct mounting of accessories to the fan casing. The length of the nacelle can be advantageously reduced which reduces the overall cost and weight which, in turn, reduces the aerodynamic drag and improved fuel efficiency. These improvements also lead to further weight and drag profiles by reducing the length of the pylon structure and profile.

In an alternative embodiment of the invention a thrust reverser unit that includes a bypass duct that is blocked by the inner wall of the cowl which, in its translated position, has a radial inner portion that abuts the core engine fairing. Such an alternative engine construction is described in EP1852595.

The invention claimed is:

1. A gas turbine engine comprising
a core engine;
a nacelle having a cowl translatable along an engine axis of the core engine from a stowed position to a deployed position; and
a thrust reverser cascade extending circumferentially about the engine axis;
wherein the cowl has a forwardly extending tongue that in the deployed position of the cowl is at a same axial position as the thrust reverser cascade and which engages the thrust reverser cascade to provide hoop continuity to the thrust reverser cascade, and
wherein the forwardly extending tongue is located at only a bottom of the cowl and the forwardly extending tongue is radially outward of the thrust reverser cascade.

2. A gas turbine engine according to claim 1, wherein in the stowed position of the cowl the forwardly extending tongue is at a same axial position as the thrust reverser cascade.

3. A gas turbine engine according to claim 1, wherein the thrust reverser cascade is secured to and translatable with the cowl.

4. A gas turbine according to claim 1, wherein the thrust reverser cascade is provided by at least two circumferentially extending portions, wherein two of the circumferentially extending portions are separated by the forwardly extending tongue.

5. A gas turbine engine according to claim 1, further comprising an accessory in a volume defined in part by the forwardly extending tongue and opposing thrust reverser cascade.

6. A gas turbine engine according to claim 5, wherein the thrust reverser cascade extends in opposite directions circumferentially from the forwardly extending tongue.

7. A gas turbine engine according to claim 5, wherein the accessory is mounted to an engine fan case.

8. A gas turbine engine according to claim 1, wherein the forwardly extending tongue has one or more radially extending lugs connecting to the thrust reverser cascade.

9. A gas turbine engine according to claim 1, wherein the forwardly extending tongue extends axially from an outer wall of the translating cowl.

10. A gas turbine engine according to claim 1, wherein the forwardly extending tongue is on an underside of the core engine to inhibit generation of lift by air flowing through the thrust reverser cascade.

11. A gas turbine engine according to claim 1, wherein the gas turbine engine has a pylon for connecting the gas turbine engine to an aircraft wing, the translating cowl having two doors each connected to the pylon through a hinge for rotating each door outwards to provide access to an engine core, wherein the forwardly extending tongue is provided by abutting parts, each door having one of the abutting parts.

* * * * *